United States Patent
Wang

(10) Patent No.: US 10,901,528 B2
(45) Date of Patent: Jan. 26, 2021

(54) METHOD AND APPARATUS FOR ADJUSTING ORIENTATION, AND ELECTRONIC DEVICE

(71) Applicant: Beijing Zhigu Rui Tuo Tech Co., Ltd., Beijing (CN)

(72) Inventor: Zhengxiang Wang, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 0 days.

(21) Appl. No.: 15/268,784

(22) Filed: Sep. 19, 2016

(65) Prior Publication Data

US 2017/0123513 A1    May 4, 2017

(30) Foreign Application Priority Data

Oct. 30, 2015 (CN) .......................... 2015 1 0729464

(51) Int. Cl.
*G09G 1/00* (2006.01)
*G06F 3/0346* (2013.01)
(Continued)

(52) U.S. Cl.
CPC .......... *G06F 3/0346* (2013.01); *G06F 1/1694* (2013.01); *G06F 3/04845* (2013.01); *G06F 3/04883* (2013.01); *G06F 2200/1614* (2013.01)

(58) Field of Classification Search
CPC .. G09G 5/00; G09G 2340/0492; G09G 3/012; G06F 3/0346; G06F 2200/1614
See application file for complete search history.

(56) References Cited

U.S. PATENT DOCUMENTS

| 9,261,981 B2 * | 2/2016 | Liao ...................... G06F 1/1694 |
| 2009/0051705 A1 * | 2/2009 | Tsai ........................ G06F 3/147 345/650 |

(Continued)

FOREIGN PATENT DOCUMENTS

| CN | 102314216 A | 11/2012 |
| CN | 103179278 A | 6/2013 |

(Continued)

OTHER PUBLICATIONS

First Search dated Jul. 20, 2018, issued in related Chinese Application No. 201510729464.0 (1 page).

(Continued)

*Primary Examiner* — Michael A Faragalla
(74) *Attorney, Agent, or Firm* — Sheppard Mullin Richter & Hampton LLP

(57) ABSTRACT

This application relates to the field of display technologies, and provides a method and an apparatus for adjusting an orientation, and an electronic device. The method comprises: in response to a first rotation operation performed by a user on an electronic device, determining an orientation of content displayed on the screen of the electronic device; after the user performs the first rotation operation on the electronic device, determining whether an orientation of the screen is consistent with the orientation of the content; and in response to that after the user performs the first rotation operation on the electronic device, the orientation of the screen is consistent with the orientation of the content, maintaining the orientation of the content. By using the method, the apparatus, and the electronic device provided in embodiments of the present invention, content displayed on the electronic device can be adjusted to an orientation suitable for a user to view, and the user does not need to perform a specified gesture or enter an edit interface to perform a rotation operation, thereby simplifying a user operation and improving user experience.

12 Claims, 9 Drawing Sheets

(51) Int. Cl.
*G06F 3/0488* (2013.01)
*G06F 3/0484* (2013.01)
*G06F 1/16* (2006.01)

(56) References Cited

U.S. PATENT DOCUMENTS

| | | | | |
|---|---|---|---|---|
| 2011/0157231 A1* | 6/2011 | Ye | ............................ | G09G 3/20 |
| | | | | 345/649 |
| 2012/0001943 A1* | 1/2012 | Ishidera | ................ | G06F 3/0346 |
| | | | | 345/659 |
| 2014/0340395 A1* | 11/2014 | Mattila | ................ | H04N 13/275 |
| | | | | 345/420 |
| 2014/0347397 A1 | 11/2014 | Wu | | |
| 2016/0055623 A1 | 2/2016 | Li et al. | | |

FOREIGN PATENT DOCUMENTS

| | | |
|---|---|---|
| CN | 103294358 A | 9/2013 |
| CN | 103336655 A | 10/2013 |
| CN | 104182114 A | 12/2014 |

OTHER PUBLICATIONS

First Office Action dated Aug. 1, 2018, issued in related Chinese Application No. 201510729464.0 (18 page).

\* cited by examiner

METHOD AND APPARATUS FOR ADJUSTING ORIENTATION, AND ELECTRONIC DEVICE

TECHNICAL FIELD

This application relates to the field of display technologies, and in particular, to a method and an apparatus for adjusting an orientation, and an electronic device.

BACKGROUND

As electronic devices are popularized, electronic devices are almost used by people in work, study, and entertainment every day. Electronic device manufacturers have always sought to enable users to operate electronic devices more conveniently and quickly.

For example, many electronic devices are provided with a function of automatically rotating a screen. When this function is enabled, if a mode in which a user operates an electronic device changes from landscape to portrait, as shown in FIG. 1, an interface of an application (APP) or an interface of an operating system operated by the user currently automatically changes from a landscape layout to a portrait layout, to cause that the user performs an operation and control conveniently, and vice versa.

In this case, an orientation of content that is being displayed such as an electronic reading that is being read, Internet content that is being viewed, or a video that is being watched on the electronic device is not adjusted, still as shown in FIG. 1. As a result, an original orientation is always maintained for the content that is being displayed on the electronic device, and it cannot be ensured that the orientation is changed as the electronic device rotates, and that user experience is not affected.

Therefore, if the original orientation of the content displayed on the electronic device is abnormal, as shown in FIG. 2, the orientation of the displayed content cannot be rectified regardless of how the electronic device is rotated.

In a traditional operation manner, a user needs to enter an edit interface, and click on and select an option such as "rotate", to adjust the orientation of the displayed content, or as shown in FIG. 3, a user needs to slide on the screen of the electronic device to form a specified gesture, to correspondingly adjust the orientation.

In the foregoing two operation manners, the former requires a relatively complex operation, and moreover, if an APP has no edit function, an orientation cannot be adjusted; the latter requires a user to learn and know a specified gesture in advance, and moreover, when an electronic device is held by using a single hand, it is very difficult to input a specified gesture.

SUMMARY

An objective of this application is to provide a method and an apparatus for adjusting an orientation, and an electronic device.

According to a first aspect of at least one embodiment of this application, a method for adjusting an orientation is provided, wherein the method comprises:

in response to a first rotation operation performed by a user on an electronic device, determining an orientation of content displayed on the screen of the electronic device;

after the user performs the first rotation operation on the electronic device, determining whether an orientation of the screen of the electronic device is consistent with the orientation of the content displayed on the screen of the electronic device; and in response to that after the user performs the first rotation operation on the electronic device, the orientation of the screen of the electronic device is consistent with the orientation of the content displayed on the screen of the electronic device, maintaining the orientation of the content displayed on the screen of the electronic device.

According to a second aspect of at least one embodiment of this application, an apparatus for adjusting an orientation is provided, wherein the apparatus comprises:

a first determining module, configured to: in response to a first rotation operation performed by a user on an electronic device, determine an orientation of content displayed on the screen of the electronic device;

a second determining module, configured to: after the user performs the first rotation operation on the electronic device, determine whether an orientation of the screen of the electronic device is consistent with the orientation of the content displayed on the screen of the electronic device; and a first adjustment module, configured to: in response to that after the user performs the first rotation operation on the electronic device, the orientation of the screen of the electronic device is consistent with the orientation of the content displayed on the screen of the electronic device, maintain the orientation of the content displayed on the screen of the electronic device.

According to a third aspect of at least one embodiment of this application, an electronic device is provided, wherein the electronic device comprises a memory and a processor, the memory is configured to store an instruction, and the processor is configured to execute the instruction, to perform the following steps:

in response to a first rotation operation performed by a user on an electronic device, determining an orientation of content displayed on the screen of the electronic device;

after the user performs the first rotation operation on the electronic device, determining whether an orientation of the screen of the electronic device is consistent with the orientation of the content displayed on the screen of the electronic device; and in response to that after the user performs the first rotation operation on the electronic device, the orientation of the screen of the electronic device is consistent with the orientation of the content displayed on the screen of the electronic device, maintaining the orientation of the content displayed on the screen of the electronic device.

In the method and the apparatus for adjusting an orientation, and the electronic device in the embodiments of this application, according to whether an orientation of a screen of an electronic device is consistent with an orientation of content displayed on the screen of the electronic device after a user performs a first rotation operation on the electronic device, the orientation of the content displayed on the screen of the electronic device is flexibly adjusted. Content displayed on the electronic device can be adjusted to an orientation suitable for a user to view, and the user does not need to perform a specified gesture or enter an edit interface to perform a rotation operation, thereby simplifying a user operation and improving user experience.

DETAILED DESCRIPTION

Specific implementation manners of the present application are further described in detail with reference to accompanying drawings and embodiments. The following embodiments are used to describe this application, but are not intended to limit the scope of this application.

A person skilled in the art understands that sequence numbers of the following steps do not mean execution sequences in embodiments of this application. The execution sequences of the steps should be determined according to functions and internal logic of the steps, and should not be construed as any limitation on the implementation processes of the embodiments of this application.

Moreover, terminologies such as "first" and "second" in this application are used only to distinguish different steps, devices, modules, and the like; and indicate neither a particular technical meaning nor an inevitable logical sequence thereof.

Figure 4:
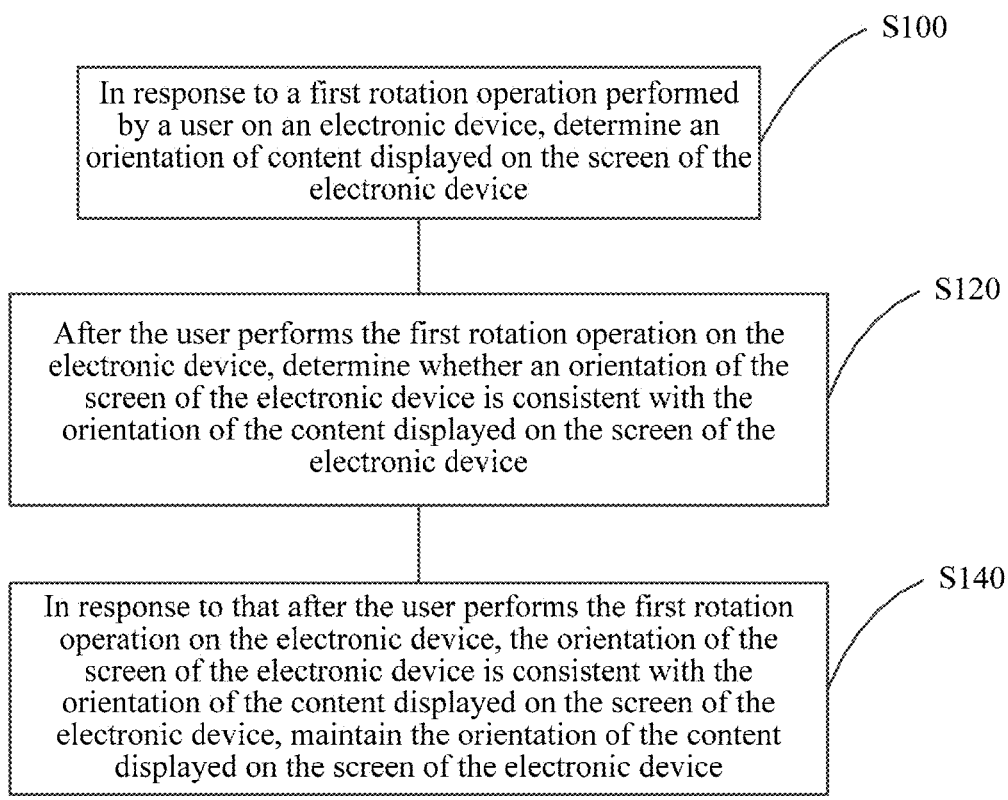
FIG. 4 is a flowchart of a method for adjusting an orientation according to an embodiment of this application.

FIG. 4 is a flowchart of a method for adjusting an orientation according to an embodiment of this application, wherein the method may be implemented on, for example, an electronic device. As shown in FIG. 4, the method may comprise:

S100: In response to a first rotation operation performed by a user on an electronic device, determine an orientation of content displayed on the screen of the electronic device.

S120: After the user performs the first rotation operation on the electronic device, determine whether an orientation of the screen of the electronic device is consistent with the orientation of the content displayed on the screen of the electronic device.

S140: In response to that after the user performs the first rotation operation on the electronic device, the orientation of the screen of the electronic device is consistent with the orientation of the content displayed on the screen of the electronic device, maintain the orientation of the content displayed on the screen of the electronic device.

In the method for adjusting an orientation in this embodiment of this application, according to whether an orientation of a screen of an electronic device is consistent with an orientation of content displayed on the screen of the electronic device after a user performs a first rotation operation on the electronic device, the orientation of the content displayed on the screen of the electronic device is flexibly adjusted. Content displayed on the electronic device can be adjusted to an orientation suitable for a user to view, and the user does not need to perform a specified gesture or enter an edit interface to perform a rotation operation, thereby simplifying a user operation and improving user experience.

Figure 1:
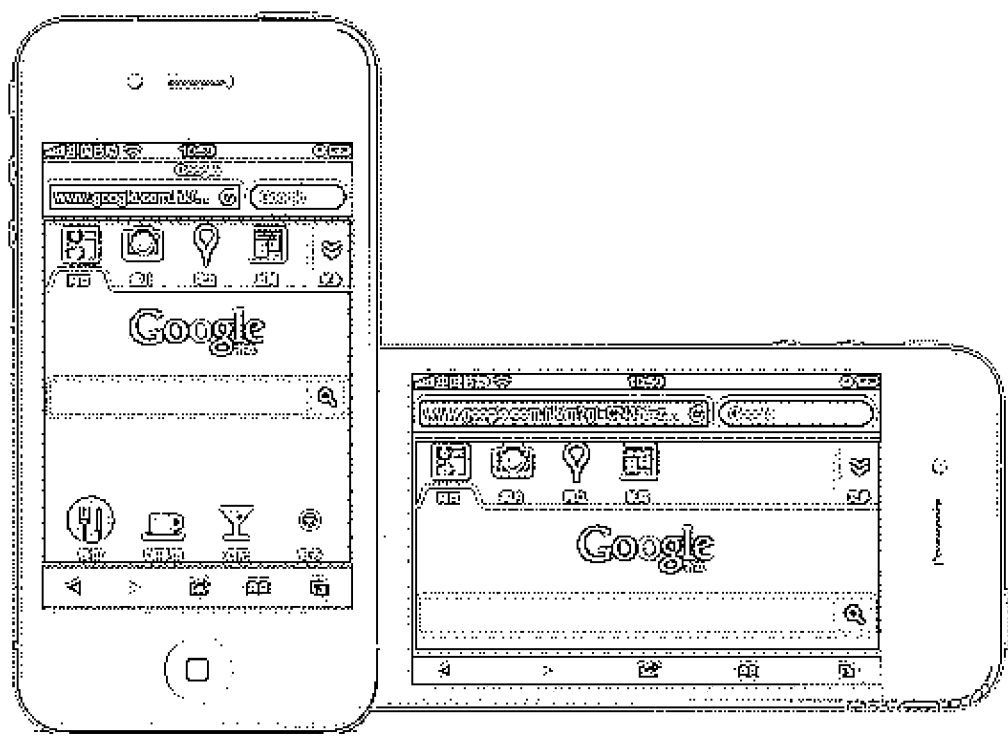
FIG. 1 is a schematic diagram of a display interface of an electronic device when the electronic device changes from landscape to portrait in a traditional case.
Figure 2:
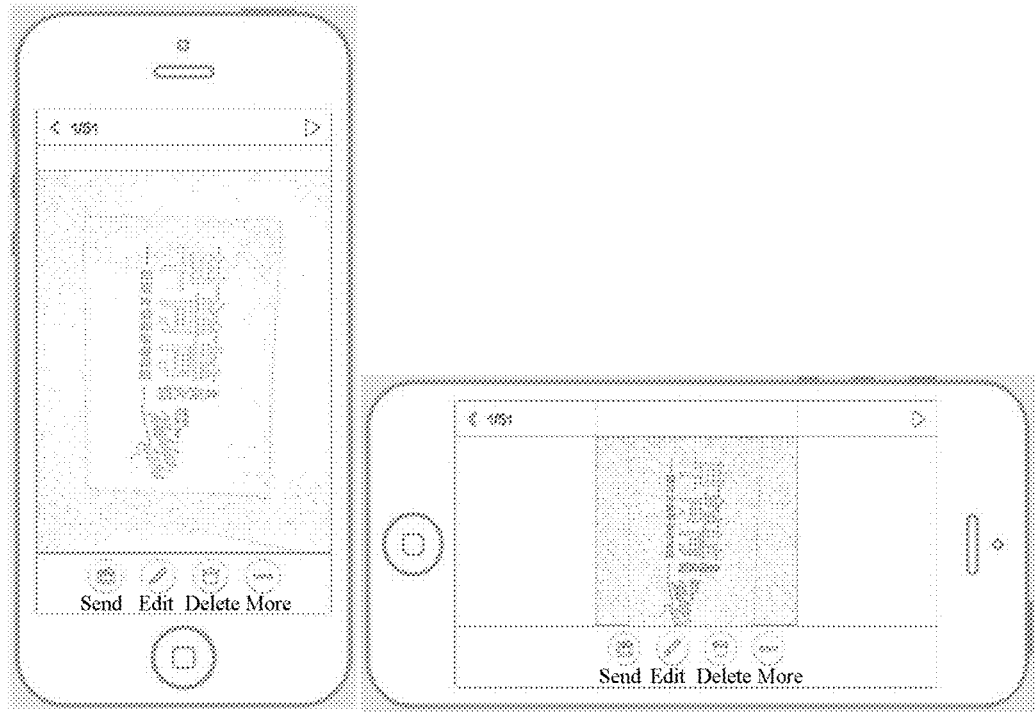
FIG. 2 is a schematic diagram of a display interface of an electronic device when the electronic device changes from landscape to portrait in another traditional case.
Figure 3:
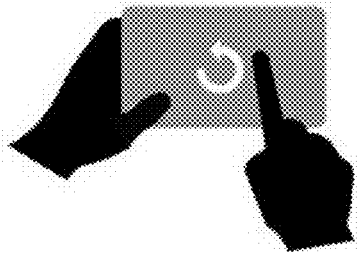
FIG. 3 is a schematic diagram showing that a user adjusts an orientation by using a gesture.
Figure 5:
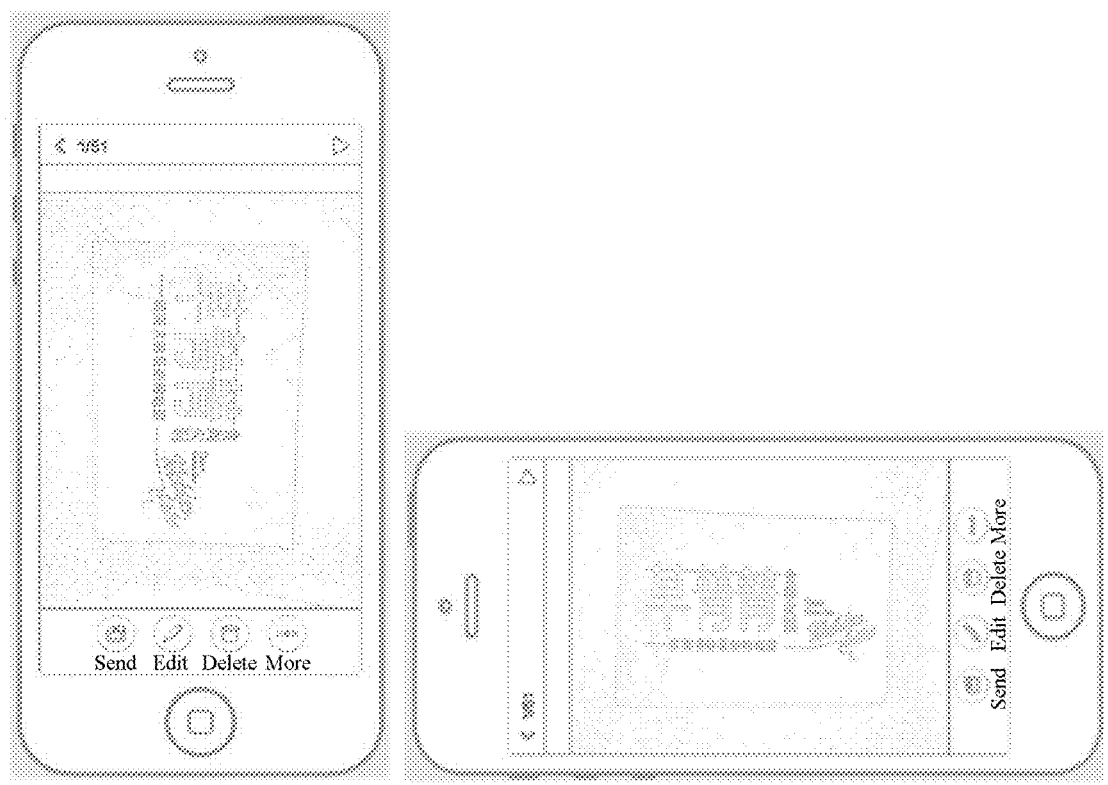
FIG. 5 is a schematic diagram of a display interface of an electronic device when the electronic device changes from landscape to portrait in a method for adjusting an orientation is used according to an embodiment of this application.

In the example of the scenario shown in FIG. 2, after the electronic device rotates, the content displayed on the screen of the electronic device also correspondingly rotates. In a traditional solution, regardless of how the electronic device is rotated, an orientation of displayed content is unsuitable for a user. However, by using the method for adjusting an orientation in this embodiment of this application, after a user rotates the screen of the electronic device, the content displayed on the screen of the electronic device is temporarily not rotated, and when it is determined that the orientation of the screen of the rotated electronic device is consistent with the original orientation of the content, the content displayed on the screen does not need to be rotated, which finally improves user experience, as shown in FIG. 5.

Exemplarily, in this embodiment of this application, the electronic device comprises but is not limited to: a mobile phone, a personal digital assistant (Full name in English: Personal Digital Assistant, PDA for short), a tablet computer, and the like.

Figure 6:
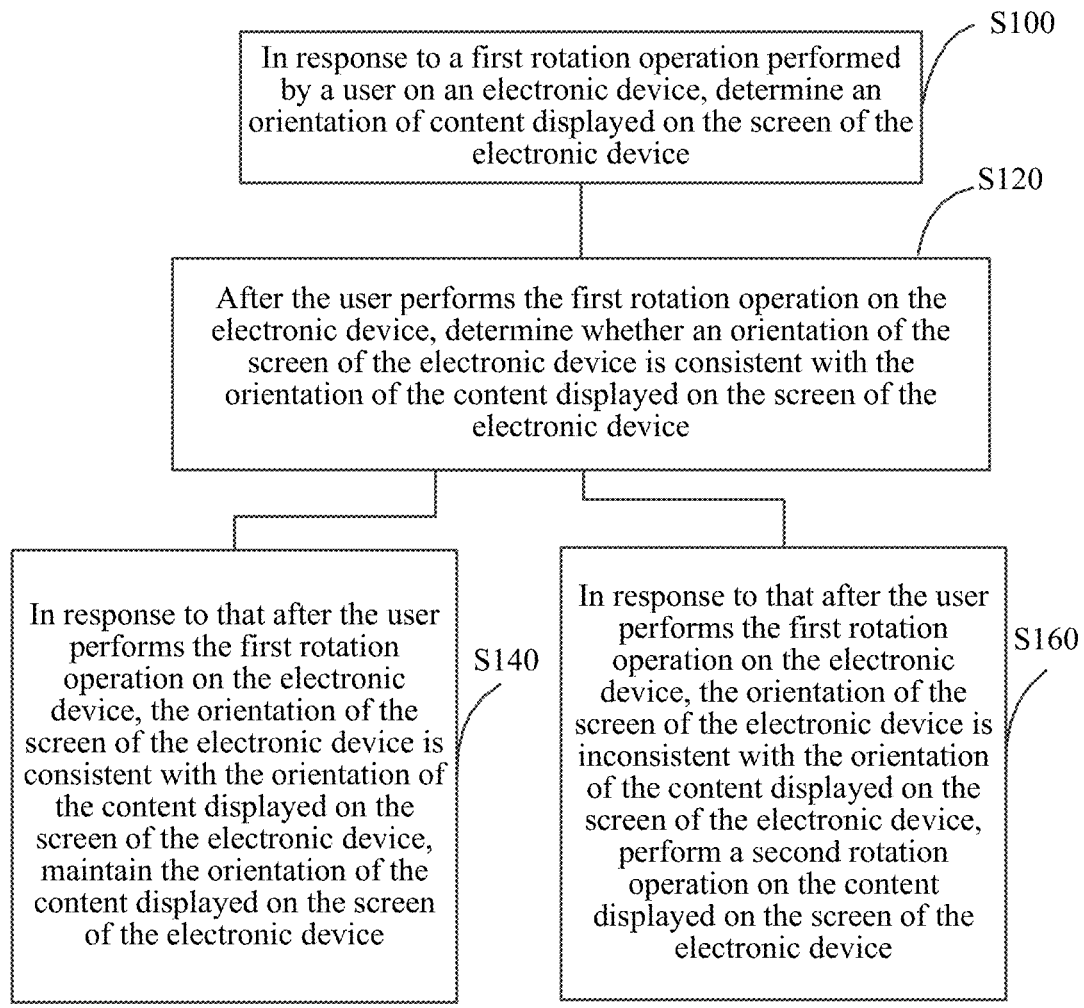
FIG. 6 is a flowchart of a method for adjusting an orientation according to another embodiment of this application.

Optionally, as shown in FIG. 6, after S120, the method may further comprise:

S160: In response to that after the user performs the first rotation operation on the electronic device, the orientation of the screen of the electronic device is inconsistent with the orientation of the content displayed on the screen of the electronic device, perform a second rotation operation on the content displayed on the screen of the electronic device.

In an optional implementation manner, a direction of the first rotation operation may be contrary to a direction of the second rotation operation. For example, a user rotates the electronic device by 90 degrees counterclockwise in the first rotation operation, and discovers that content displayed on the electronic device is not adjusted to an orientation suitable for watching as expected; therefore, the second rotation operation may be performed on the content displayed on the screen of the electronic device, for example, the content displayed on the screen of the electronic device is rotated by 90 degrees clockwise, or rotated by 180 degrees clockwise, or rotated by 270 degrees clockwise.

Certainly, this embodiment of this application is not limited to this case. In another optional implementation manner, alternatively, the direction of the first rotation operation may be the same as the direction of the second rotation operation. For example, a user rotates the electronic device by 90 degrees counterclockwise in the first rotation operation, and discovers that content displayed on the electronic device is not adjusted to an orientation suitable for watching as expected; therefore, the second rotation operation may be performed on the content displayed on the screen of the electronic device, for example, the content displayed on the screen of the electronic device is rotated by 90 degrees counterclockwise, or rotated by 180 degrees counterclockwise, or rotated by 270 degrees counterclockwise.

Figure 7A:
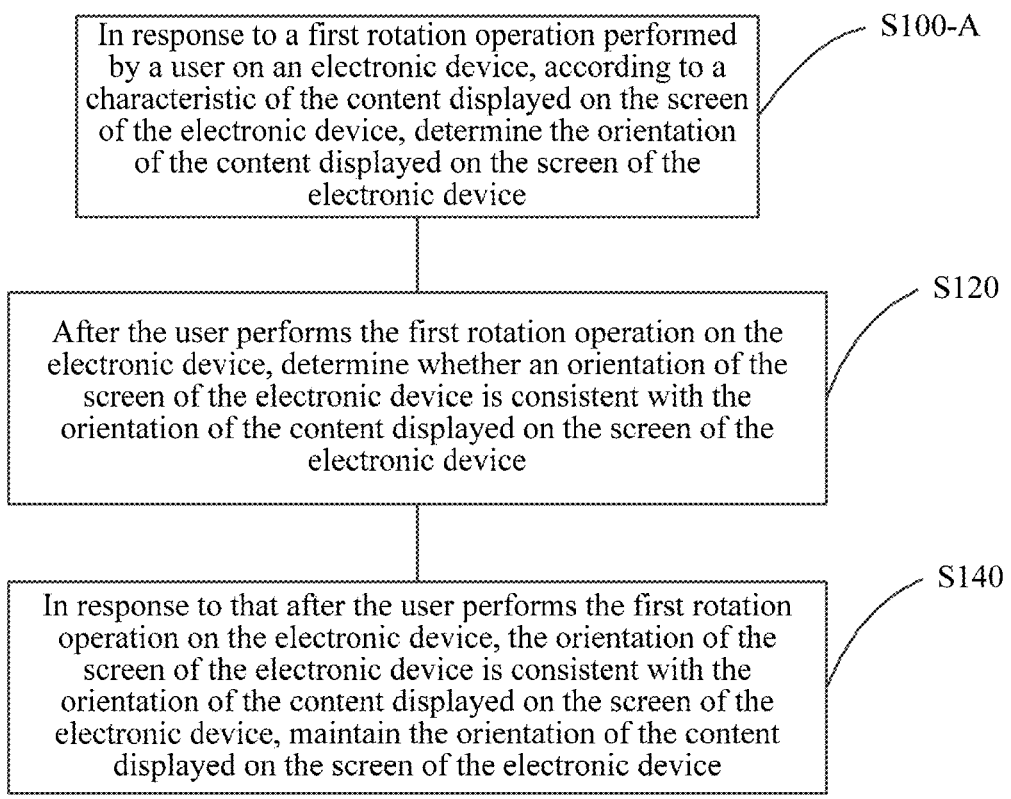
FIG. 7a is a flowchart of a method for adjusting an orientation according to another embodiment of this application.

As shown in FIG. 7a, in another optional implementation manner of this application, the determining an orientation of content displayed on the screen of the electronic device in S100 may comprise:

S100-A: According to a characteristic of the content displayed on the screen of the electronic device, determine the orientation of the content displayed on the screen of the electronic device.

Exemplarily, a characteristic of at least a part of the content displayed on the screen of the electronic device may be extracted, and the orientation of the content displayed on the screen of the electronic device is determined according to the extracted characteristic.

For example, if the content displayed on the screen of the electronic device is a picture of a person, the picture of the person or a part of the picture of the person may be processed and analyzed, to extract a characteristic area or a characteristic point, to recognize an orientation of the picture of the person. For example, it may be determined whether the picture of the person is longitudinal or transverse according to a line that connects the two eyes of the picture of the person, and a position of the nose of the picture of the person.

Figure 7B:
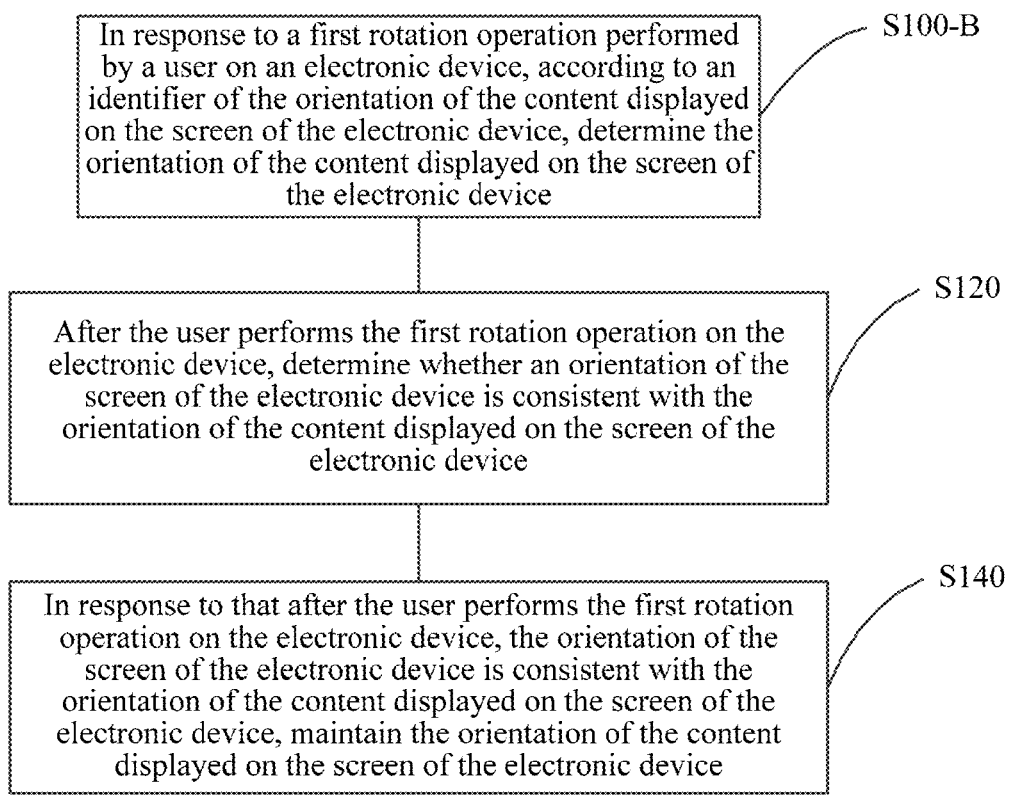
FIG. 7b is a flowchart of a method for adjusting an orientation according to another embodiment of this application.

As shown in FIG. 7b, in another optional implementation manner of this application, the determining an orientation of content displayed on the screen of the electronic device in S100 may comprise:

S100-B: According to an identifier of the orientation of the content displayed on the screen of the electronic device, determine the orientation of the content displayed on the screen of the electronic device.

Exemplarily, when acquiring content (for example, taking a photo or recording a video) with cameras, some electronic devices may record an orientation of the content by using one or more identifiers; and an orientation of the content displayed on the screen of the electronic device may be determined subsequently according to the orientation identifiers as needed.

For example, a reference direction may be determined in advance, for example, may be a longitudinal direction, and the orientation identifier may comprise information such as "an included angle between the reference direction and the orientation of the content in a clockwise direction or in a counterclockwise direction", as shown in Table 1.

TABLE 1

| Orientation identifier | Rotation operation | |
|---|---|---|
| | Direction | Included angle between a reference direction and content |
| Identifier 1 | Counterclockwise | 180 degrees |
| Identifier 2 | Counterclockwise | 90 degrees |
| Identifier 3 | Clockwise | 90 degrees |

In an actual application, a variation range between −α and +α may be allowed for the included angle, for example, the included angle is actually 80 degrees in a clockwise direction, however, if an error of 10 degrees is within the allowed variation range, it can still be considered that an orientation identifier corresponds to the identifier 3. α may be a default value, or may be set according to an actual case. If an error within a relatively large range can be tolerated, α may be set to a slightly large value, for example, ±10 degrees; and if a requirement on preciseness is relatively high, α may be set to a slightly small value, for example, ±5 degrees, or may even be set to 0 degree.

Figure 8:
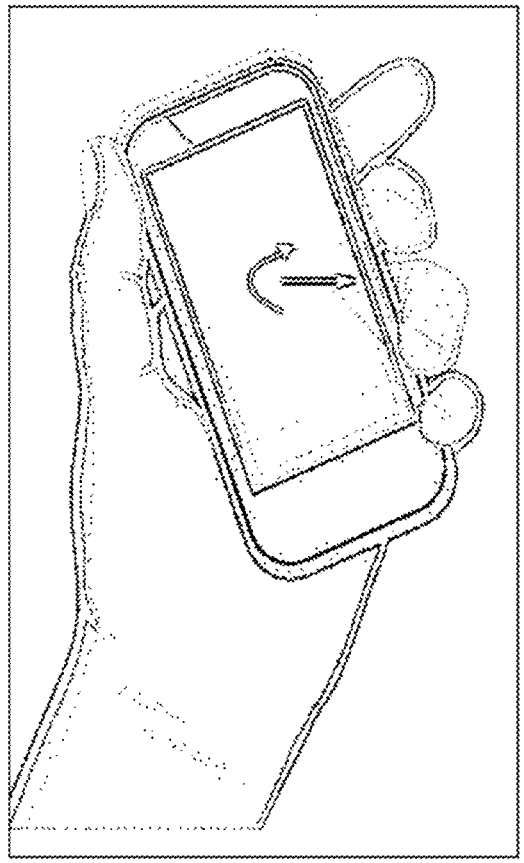
FIG. 8 is a schematic diagram showing that an electronic device rotates around a direction of the electronic device according to an embodiment of this application.

Optionally, in an embodiment of this application, a position of the electronic device may be detected according to a sensor in the electronic device. For example, as shown in FIG. 8, if it is detected that the electronic device rotates around a normal direction (normal direction) of the electronic device, it may be determined that a user performs the first rotation operation on the electronic device.

Exemplarily, the sensor comprises but is not limited to: a gravity acceleration sensor or a camera (Camera).

Figure 9:
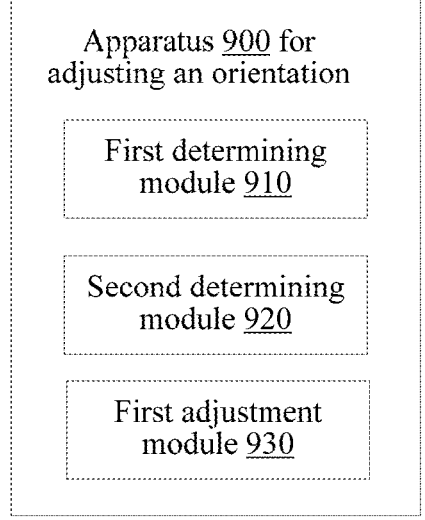
FIG. 9 is a schematic structural diagram of modules of an apparatus for adjusting an orientation according to an embodiment of this application.

FIG. 9 is a schematic structural diagram of modules of an apparatus for adjusting an orientation according to an embodiment of this application. The apparatus for adjusting an orientation may be an electronic device such as a mobile phone, a PDA, a tablet computer, or a camera, or may be one or more chips, a partial circuit, or one or more functional modules in an electronic device. As shown in FIG. 9, the apparatus 900 for adjusting an orientation may comprise:

a first determining module 910, configured to: in response to a first rotation operation performed by a user on an electronic device, determine an orientation of content displayed on the screen of the electronic device;

a second determining module 920, configured to: after the user performs the first rotation operation on the electronic device, determine whether an orientation of the screen of the electronic device is consistent with the orientation of the content displayed on the screen of the electronic device; and a first adjustment module 930, configured to: in response to that after the user performs the first rotation operation on the electronic device, the orientation of the screen of the electronic device is consistent with the orientation of the content displayed on the screen of the electronic device, maintain the orientation of the content displayed on the screen of the electronic device.

In the apparatus for adjusting an orientation in this embodiment of this application, according to whether an orientation of a screen of an electronic device is consistent with an orientation of content displayed on the screen of the electronic device after a user performs a first rotation operation on the electronic device, the orientation of the content displayed on the screen of the electronic device is flexibly adjusted. Content displayed on the electronic device can be adjusted to an orientation suitable for a user to view, and the user does not need to perform a specified gesture or enter an edit interface to perform a rotation operation, thereby simplifying a user operation and improving user experience.

Figure 10:
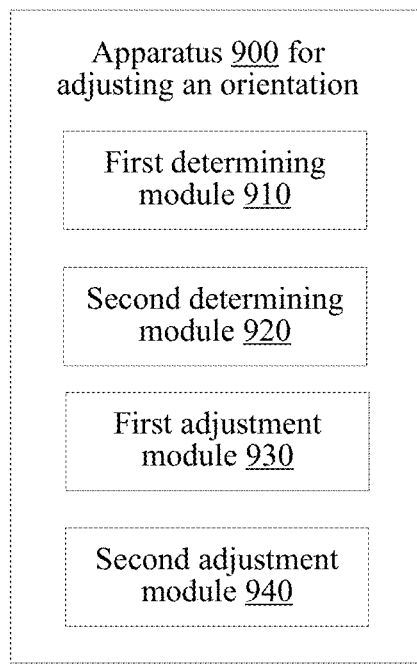
FIG. 10 is a schematic structural diagram of modules of an apparatus for adjusting an orientation according to another embodiment of this application.

Referring to FIG. 10, in an optional implementation manner, the apparatus 900 for adjusting an orientation may further comprise:

a second adjustment module 940, configured to: in response to that after the user performs the first rotation operation on the electronic device, the orientation of the screen of the electronic device is inconsistent with the orientation of the content displayed on the screen of the electronic device, perform a second rotation operation on the content displayed on the screen of the electronic device.

Figure 11:
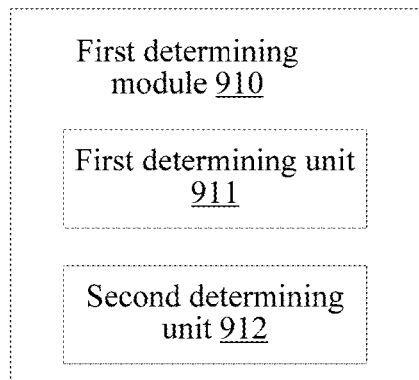
FIG. 11 is a schematic structural diagram of modules of an apparatus for adjusting an orientation according to still another embodiment of this application.

In an optional implementation manner, as shown in FIG. 11, the first determining module 910 may further comprise:

a first determining unit 911, configured to: according to a characteristic of the content displayed on the screen of the electronic device, determine the orientation of the content displayed on the screen of the electronic device; and/or a second determining unit 912, configured to: according to an identifier of the orientation of the content displayed on the screen of the electronic device, determine the orientation of the content displayed on the screen of the electronic device.

Figure 12:
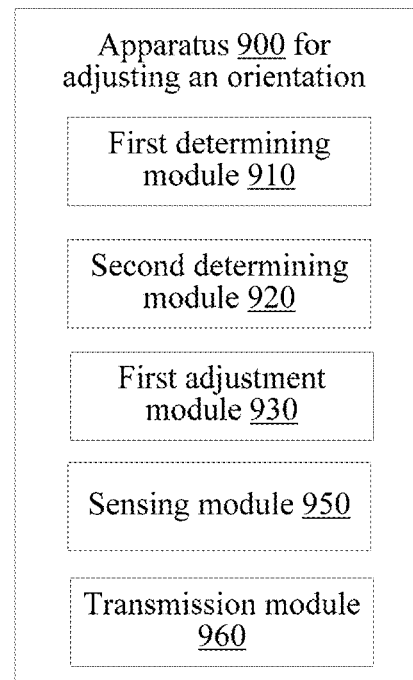
FIG. 12 is a schematic structural diagram of modules of an apparatus for adjusting an orientation according to still another embodiment of this application.

Referring to FIG. 12, in an optional implementation manner, the apparatus 900 for adjusting an orientation may further comprise:

a sensing module 950, configured to detect a position of the electronic device; and a transmission module 960, configured to: in response to that it is detected that the electronic device rotates around a normal direction (normal direction) of the electronic device, transmit a detection result to the first determining module 910.

Optionally, the sensor 950 may comprise a gravity acceleration sensor or a camera.

Figure 13:
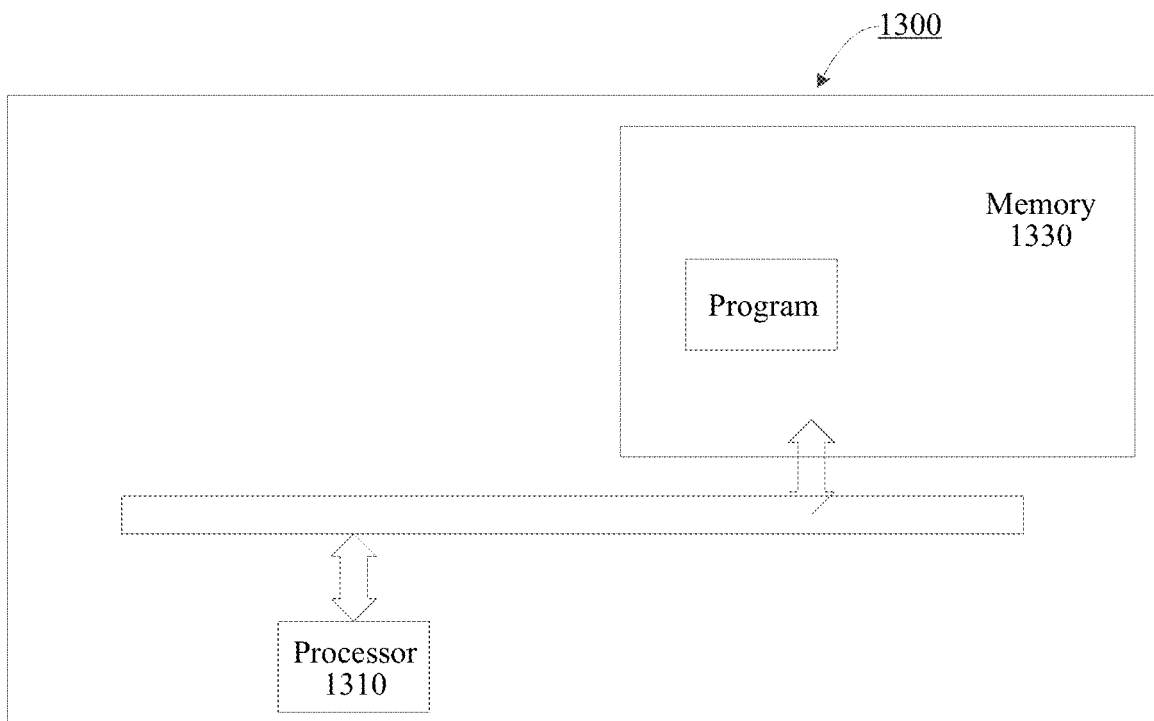
FIG. 13 is a schematic structural diagram of an electronic device according to an embodiment of this application.

Referring to FIG. 13, another embodiment of this application provides an electronic device 1300. Referring to FIG. 13, the electronic device 1300 may comprise:

a processor (processor) 1310 and a memory (memory) 1330.

The memory 1330 is configured to store an instruction, and the processor 1310 is configured to execute the instruction, to perform the following steps:

in response to a first rotation operation performed by a user on an electronic device, determining an orientation of content displayed on the screen of the electronic device;

after the user performs the first rotation operation on the electronic device, determining whether an orientation of the screen of the electronic device is consistent with the orientation of the content displayed on the screen of the electronic device; and in response to that after the user performs the first rotation operation on the electronic device, the orientation of the screen of the electronic device is consistent with the orientation of the content displayed on the screen of the electronic device, maintaining the orientation of the content displayed on the screen of the electronic device.

It may be clearly understood by a person skilled in the art that, for the purpose of a convenient and brief description, for specific working processes of the apparatus for adjusting an orientation and the electronic device described above, reference may be made to corresponding process descriptions in the method for adjusting an orientation in the foregoing method embodiment, which are not described herein again.

In conclusion, by using the electronic device in this embodiment of this application, according to whether an orientation of a screen of an electronic device is consistent with an orientation of content displayed on the screen of the electronic device after a user performs a first rotation operation on the electronic device, the orientation of the content displayed on the screen of the electronic device is flexibly adjusted. Content displayed on the electronic device can be adjusted to an orientation suitable for a user to view, and the user does not need to perform a specified gesture or enter an edit interface to perform a rotation operation, thereby simplifying a user operation and improving user experience.

A person of ordinary skill in the art may be aware that, the exemplary units and method steps described in the embodiments disclosed in this specification may be implemented by electronic hardware, or a combination of computer software and the electronic hardware. Whether the functions are performed by hardware or software depends on particular applications and design constraint conditions of the technical solutions. A person skilled in the art may use different methods to implement the described functions for each particular application, but the implementation should not be construed as exceeding the scope of the present application.

When the functions are implemented in a form of a software functional unit, and are sold or used as an independent product, the functions may be stored in a computer readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or a part of the steps of the method described in the embodiment of this application. The foregoing storage medium comprises any medium that can store program code, such as a USB flash drive, a removable hard disk, a read-only memory (Read-Only Memory, ROM), a random access memory (Random Access Memory, RAM), a magnetic disk, or an optical disc.

The foregoing implementation manners are only used for describing the present application, and are not intended to limit the present application. A person of ordinary skill in the art may make various changes and variations without departing from the spirit and scope of the present application; therefore, any equivalent technical solution falls within the scope of the present application, and patent protection scope of the present application shall be defined by claims.

What is claimed is:

1. A method for adjusting an orientation, comprising:
    capturing an image or video by an electronic device;
    in response to a first rotation operation of the electronic device, in which an orientation of content of the image or video displayed on a screen of the electronic device is rotated according to a direction of the first rotation operation, determining the orientation of the content displayed on the screen of the electronic device;
    determining whether an orientation of the screen of the electronic device is consistent with the orientation of the content displayed on the screen of the electronic device; and
    in response to determining that the orientation of the screen of the electronic device is consistent with the orientation of the content displayed on the screen of the electronic device, maintaining the orientation of the content displayed on the screen of the electronic device,
    wherein the determining the orientation of the content displayed on the screen of the electronic device comprises:
    determining the orientation of the content displayed on the screen of the electronic device according to an identifier of the orientation of the content displayed on the screen of the electronic device, wherein one or more identifiers of the orientation of the content are recorded when capturing the image or video, and the one or more identifiers indicate an included angle between a reference direction and the orientation of the content in a clockwise direction or in a counterclockwise direction, wherein the reference direction is a predetermined direction.

2. The method of claim 1, further comprising:
    in response to that after the first rotation operation of the electronic device, the orientation of the screen of the electronic device is inconsistent with the orientation of the content displayed on the screen of the electronic device, performing a second rotation operation on the content displayed on the screen of the electronic device.

3. The method of claim 2, wherein the direction of the first rotation operation is the same as or contrary to a direction of the second rotation operation.

4. The method of claim 1, further comprising:
before the determining the orientation of content displayed on the screen of the electronic device,
determining that a user performs the first rotation operation on the electronic device.

5. The method of claim 4, wherein the determining that the user performs the first rotation operation on the electronic device comprises:
detecting, according to a sensor in the electronic device, a rotation of the electronic device around a normal direction of the electronic device, and determining the first rotation operation of the electronic device.

6. The method of claim 5, wherein the sensor comprises: a gravity acceleration sensor or a camera.

7. An electronic device, comprising a memory and a processor, wherein the memory is configured to store an instruction, and the processor is configured to execute the instruction, to perform operations including:
capturing an image or video;
in response to a first rotation operation of the electronic device, in which an orientation of content of the image or video displayed on a screen of the electronic device is rotated according to a direction of the first rotation operation, determining the orientation of the content displayed on the screen of the electronic device;
determining whether an orientation of the screen of the electronic device is consistent with the orientation of the content displayed on the screen of the electronic device; and
in response to determining that the orientation of the screen of the electronic device is consistent with the orientation of the content displayed on the screen of the electronic device, maintaining the orientation of the content displayed on the screen of the electronic device, wherein the determining the orientation of the content displayed on the screen of the electronic device comprises:
determining the orientation of the content displayed on the screen of the electronic device according to an identifier of the orientation of the content displayed on the screen of the electronic device, wherein one or more identifiers of the orientation of the content are recorded when capturing the image or video, and the one or more identifiers indicate an included angle between a reference direction and the orientation of the content in a clockwise direction or in a counterclockwise direction, wherein the reference direction is a predetermined direction.

8. The electronic device of claim 7, wherein the operations further comprise:
detecting a position of the electronic device.

9. The electronic device of claim 8, further comprising:
a gravity acceleration sensor or a camera.

10. The electronic device of claim 7, wherein the operations further comprise:
in response to that after the first rotation operation of the electronic device, the orientation of the screen of the electronic device is inconsistent with the orientation of the content displayed on the screen of the electronic device, performing a second rotation operation on the content displayed on the screen of the electronic device.

11. The method of claim 1, wherein the determining the orientation of the content displayed on the screen of the electronic device comprises:
extracting a characteristic of at least a part of the content displayed on the screen of the electronic device, and determining the orientation of the content displayed on the screen of the electronic device according to the extracted characteristic.

12. The electronic device of claim 7, wherein the operations further comprise:
according to a characteristic of the content displayed on the screen of the electronic device, determining the orientation of the content displayed on the screen of the electronic device.

\* \* \* \* \*